United States Patent
Tien et al.

[19]

[11] Patent Number: 6,157,976
[45] Date of Patent: Dec. 5, 2000

[54] PCI-PCI BRIDGE AND PCI-BUS AUDIO ACCELERATOR INTEGRATED CIRCUIT

[75] Inventors: Paul Tien, Fremont; Cheng-Yeuan Tsay, Pleasanton; Rsong-Hsiang Shiao, Fremont, all of Calif.

[73] Assignee: ESS Technology, Fremont, Calif.

[21] Appl. No.: 09/074,657

[22] Filed: May 6, 1998

[51] Int. Cl.⁷ .............................. G06F 13/00; G06F 13/38
[52] U.S. Cl. .......................... 710/129; 710/127; 710/64; 345/435; 84/604; 84/621; 84/622; 84/647
[58] Field of Search .............................. 345/435; 710/127, 710/129, 64; 84/602, 604, 621, 622, 647, 454; 704/258

[56] References Cited

U.S. PATENT DOCUMENTS 5,689,080  11/1997  Gulick ........................................ 84/604
5,909,559   6/1999  So ........................................... 710/127

OTHER PUBLICATIONS

PCI System Architecture, Tom Shanley/Don Anderson, 1995, pp. 381–382.

*Primary Examiner*—Ayaz R. Sheikh
*Assistant Examiner*—Rupal D. Dharia
*Attorney, Agent, or Firm*—Gray Cary Ware & Freidenrich

[57] ABSTRACT

A semiconductor device with an embedded PCI 2.1 compliant bridge provides expanded functionality as system-level implementations of a PCI-to-PCI bridge, and enhances the level of integration possible. The embedded PCI-to-PCI bridge allows the creation of multi-function, multimedia add-on cards supporting multiple devices. Multi-function, multimedia subsystems that provide audio, graphics, MPEG, etc., are mapped into a bridged-to PCI-bus that keeps such traffic off the main PCI-bus. The advantage for the system or add-in card vendor is that the various multimedia chips that are combined can come from different sources, providing an optimized and highly customized combination of functions.

1 Claim, 2 Drawing Sheets

PCI-PCI BRIDGE AND PCI-BUS AUDIO ACCELERATOR INTEGRATED CIRCUIT

FIELD OF THE INVENTION

The present invention relates to digital electronic circuits, and more particularly to personal computer PCI-bus systems.

DESCRIPTION OF THE PRIOR ART

The peripheral component interface (PCI) bus has become the interface bus of choice for high-speed devices because it is well-equipped to handle newer, more demanding applications with its 32-bit data path, 33 MHz clock speed and a maximum data transfer rate of 132 MB/sec.

However, PCI loading constraints limit the number of devices that can be supported directly on a system motherboard or through expansion slots, so PCI-to-PCI bridge chips have been developed by a number of major suppliers to increase the number of available system expansion slots. Embedding a bridge in a semiconductor device that also supplies other functionality provides a higher degree of integration and enables the creation of multi-function, multimedia expansion cards, where a single add-in card could support audio, graphics acceleration and video conferencing.

The PCI bus is typically isolated from the CPU local bus by a PCI controller, a so-called "Northbridge". The CPU can thereby write data to PCI peripherals and go on to its next operation rather than waiting for the transfer to complete. The PCI controller stores the data in its buffer, and sends it out later at the most efficient rate.

The PCI-bus supports intelligent-device bus mastering, so other masters can take control of the bus and do their jobs independent of the CPU. The CPU can run in parallel with the bus master peripheral because of the buffered design.

The number of PCI peripheral devices that can be supported by a single PCI-bus is based on the electrical loading constraints defined in the industry-standard "PCI 2.1 Specification". A compliant PCI-bus is capable of supporting a total of ten loads, and two loads are consumed by the basic PCI chipset associated with the CPU. PC-device controllers that are built into the motherboard present only a single load.

A single PCI-bus can therefore only support four expansion slots without violating the specification's loading constraints, e.g., one PCI device per expansion slot. High-end system designers have recently begun to build systems using PCI-to-PCI bridges to provide more expansion slots on the motherboard. The PCI bus specifications provide for an automatic configuration of any adapter or peripheral plugged into the bus to eliminate conflicts between boards in the system and the need for jumper headers on a board.

SUMMARY OF THE INVENTION

It is therefore an object of the present invention to provide a system for supporting ISA-bus applications software on a PCI-based hardware system.

It is a further object of the present invention to provide a direct memory access controller that accepts ISA-bus interrupt controller commands and accesses and that translates these into PCI-bus equivalent interrupt controller commands and accesses.

It is a still further object of the present invention to emulate an ISA-bus interrupt controller that accepts and responds to direct memory access controller commands and accesses for execution by a PCI-bus interrupt controller mapped into a PCI-bus memory resource.

Briefly, a circuit embodiment of the present invention comprises a PCI-PCI bridge core integrated on the same chip as a PCI-bus audio accelerator.

An advantage of the present invention is that more functionality can be implemented on both PCI-bus add-in cards and motherboards.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a PC system embodiment of the present invention; and FIG. 2 is a function block diagram of an audio accelerator with an auxiliary integrated PCI-PCI bridge core.

DETAILED DESCRIPTION OF THE PREFERRED EMBODIMENT

Figure 1:
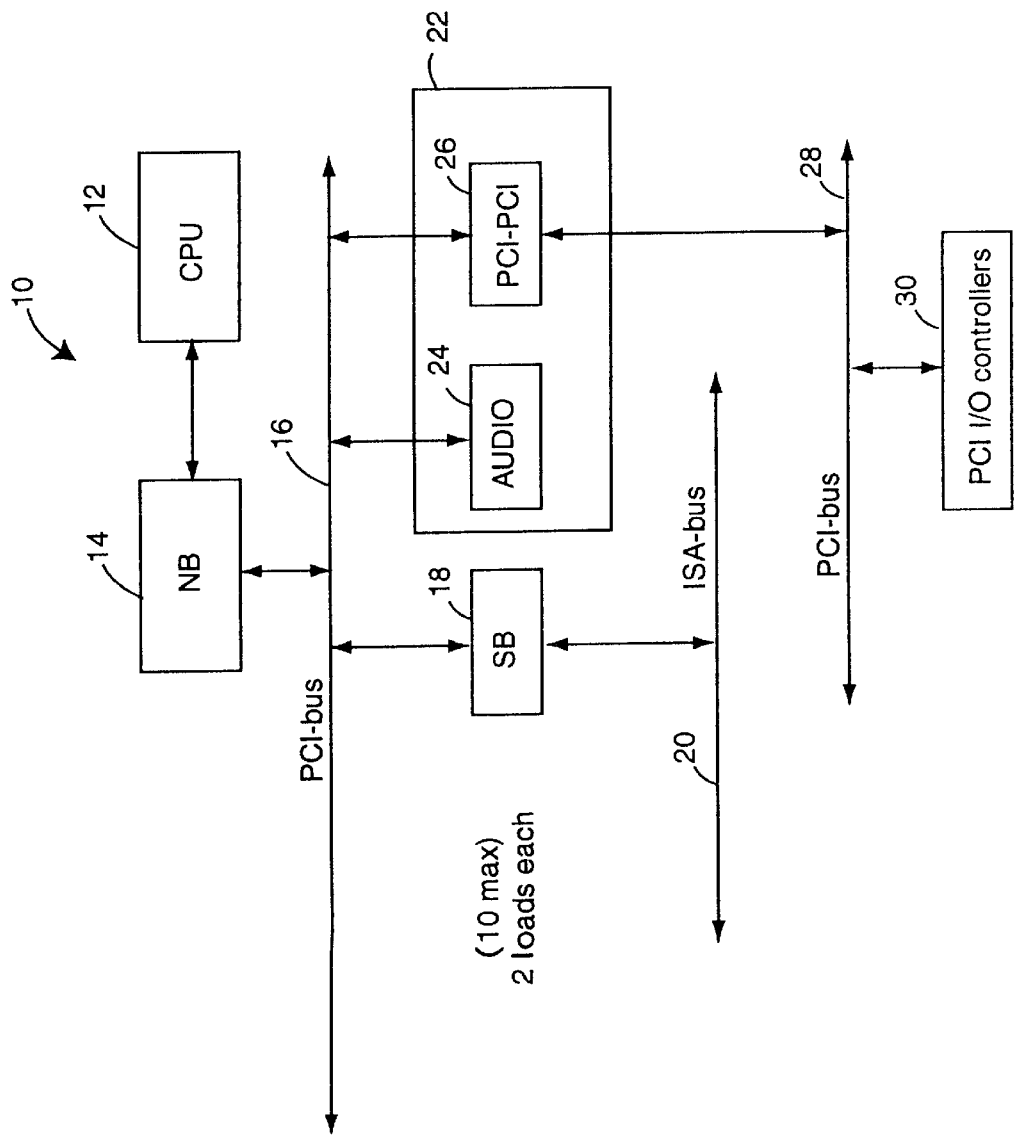

FIG. 1 illustrates a personal computer (PC) embodiment of the present invention, referred to herein by the general reference numeral 10. The PC 10 comprises a microprocessor (CPU) 12, a system controller (Northbridge "NB") 14, and a peripheral component interconnect (PCI) bus 16. A peripheral-bus controller (Southbridge "SB") 18 provides a bridge to several buses including an industry standard architecture (ISA) bus 20. A PCI-bus audio accelerator peripheral 22 includes a PCI-bus resident audio accelerator 24 and a PCI-PCI bridge 26 both integrated as cores on the same integrated circuit (IC). The PCI-PCI bridge 26 provides more slots on a secondary PCI-bus 28 for a plurality of input-output (I/O) controllers 30.

The PCI bus is the ideal medium for utilization as a multimedia interface due to its high bandwidth, support for bus mastering, and low demands on CPU capacity. By using the PCI bus as a multimedia bridge, multimedia subsystems can be designed on a adapter, e.g., PCI-bus expansion card, for different target markets. The high level of integration achieved by using embedded PCI-to-PCI technology is valuable where motherboard form factors decreased in size and yet the number of multimedia functions expand.

In one embodiment, the system controller 14 comprises an Advanced Micro-Devices (Sunnyvale, Calif.) AMD-640 system controller ("Northbridge") has a 64-bit Socket-7 interface, integrated writeback cache controller, system memory controller, and PCI bus controller. Such Socket-7 interface is optimized for the AMD-K6 processor, providing 3-1-1-1-1-1-1-1 transfer timing for both read and write transactions from PBSRAM at 66 MHz. (The number sequence refers to the CPU clock "t" cycles for each operation, i.e., 3-1-1-1 means the first data will be available at the third "t" when issue the operation, then the consequence data only need additional one "t" cycle, and so on.)

The AMD-640's internal memory controller has a data buffering design that uses four cache lines, e.g., sixteen quadwords, of processor-to-DRAM or cache-to-DRAM write buffering with concurrent writeback capability to accelerate writeback and write-miss cycles. The integrated PCI bus controller does concurrent processor and PCI operation with a five-doubleword posted write buffer. PCI concurrency with DRAM or cache memory is achieved through a 48-doubleword post write buffer and 26-doubleword prefetch buffer. Byte-merging is used to optimize processor-to-PCI throughput and reduce PCI bus traffic by converting consecutive processor addresses into burst PCI cycles. The AMD-640 system controller uses a variety of techniques to minimize PCI initiator read latency and DRAM access, including snoop ahead, snoop filtering, forwarding cache writebacks to the PCI initiator, and merging L1 writebacks into the PCI-posted write buffers to minimize PCI initiator read latency and DRAM utilization. To minimize snoop overhead, the integrated PCI controller supports enhanced PCI bus commands, such as memory-read-line, memory-read-multiple, and memory-write-invalidate. The combination allows a PCI initiator to achieve the full 133-Mbps burst transfer rate.

In another embodiment, the peripheral-bus controller 18 comprises an AMD-645 peripheral bus controller ("Southbridge"). The AMD-645 has an integrated ISA bus controller, enhanced master mode PCI EIDE controller with Ultra DMA/33 technology, an ACPI-compatible power management unit, a USB controller, a PS2-compatible keyboard/mouse controller, and a real-time clock (RTC) with extended 256-byte CMOS RAM. The on-chip EIDE controller has a dual-channel DMA engine capable of interlaced dual-channel commands. High-bandwidth PCI transfers are achieved by a sixteen double-word data FIFO with full scatter and gather capability. The integrated USB controller has a root hub with two ports having 18-level-deep data FIFOs and built-in physical layer transceivers.

The AMD-645 peripheral bus controller is marketed as meeting Microsoft Windows® 95 Plug-and-Play requirements with steerable PCI interrupts, ISA interrupts, and DMA channels. The integrated power management unit is compliant with ACPI and APM and provides dedicated input pins for external modem ring indication and power-on, five general-purpose I/O pins with option for I2C port, and sixteen general-purpose pins that can be programmed as inputs or outputs. To manage power management events, the AMD-645 controller includes an ACPI power management timer, a GP0 timer, a GP1 timer, a secondary event timer, and a conserve mode timer. Two types of sleep states, e.g., soft-off and power-on suspend, are supported with hardware automatic wake-up. Additional functionality includes event monitoring, CPU clock throttling, hardware and software-based event handling, and multiple external SMI sources.

The PCI-bus audio accelerator peripheral 22 or PCI-expansion card may comprise an ESS Technology (Fremont, Cailf.) PCI audio accelerator chip, e.g., marketed as MAESTRO-1™. At a minimum, the PCI-bus audio accelerator peripheral 22 is preferably compliant with major industry standards including the Audio Subsystem Specification of PC97, Windows 95 DirectSound™, Windows Sound System, AC¹97 CODEC Interface, and the PCI 2.1 Bus Specification.

The Maestro-1 is a dual audio-engine architecture that comprises of a 64-voice, pipelined, wavetable synthesizer and a programmable audio signal processor that can simultaneously handle multiple audio streams of different data types, high-quality music synthesis, and voice compression and decompression. Wavetable technology uses algorithms to frequency shift a stored digitized sound sample of the instrument playing to create the various notes, tones and octaves of a performance Market acceptance of early PC wavetable sound solutions was hampered by a lack of compatibility with software developed for the SOUNDBLASTER standard and the high cost of the first implementations. Software compatibility has now been resolved by vendors such as ESS Technology through hardware legacy support. ESS Technology's solution, Transparent DMA, creates a virtual ISA bus that interfaces with the PCI bus. The expense of the first wavetable synthesis devices has also now been driven down, in part through the use of techniques such as downloadable sound fonts that also enhance performance.

The first wavetable synthesis PC audio solutions utilized ROM to store the sound samples needed to generate sound. The ROM was expensive and limited the number of sounds that a wavetable engine could produce. Also, because the audio samples were loaded by the hardware device vendor, the software developer had no control over how their application would sound with a given vendor's wavetable hardware accelerator.

ESS Technology's PC audio solutions utilize the high bandwidth PCI bus and WaveCache58 technology to store MIDI sound samples in a PC's main memory. The downloadable sound samples saves the cost of ROM and allows a software developer to determine precisely how their title will sound on every system that utilizes downloadable sound fonts.

Figure 2:
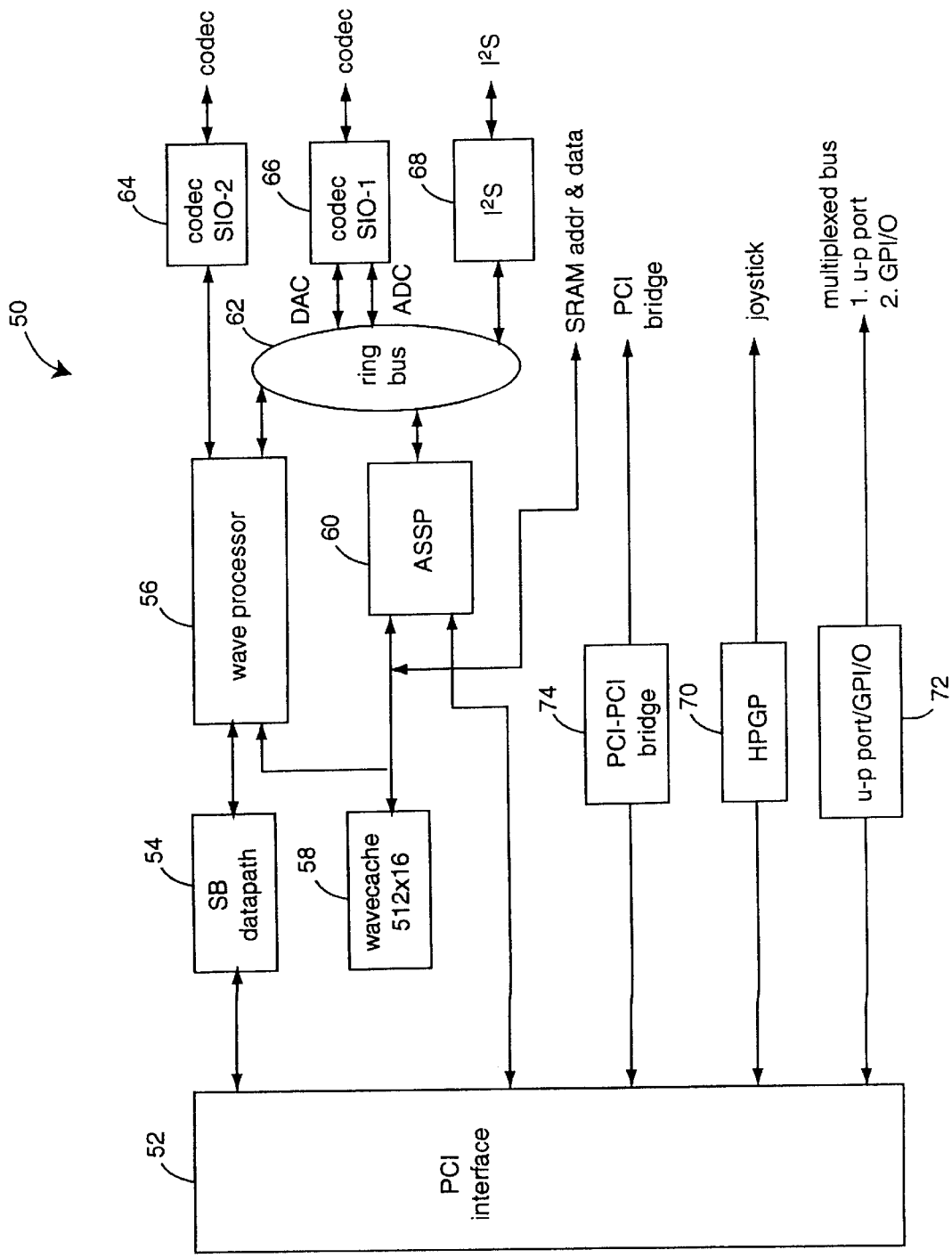

FIG. 2 illustrates a PCI-bus audio accelerator peripheral 50 that is similar to the audio accelerator peripheral 22 of FIG. 1. The PCI-bus audio accelerator peripheral 50 comprises a PCI-interface 52, a SOUNDBLASTER datapath 54, a wave processor 56, a 512×16 wave cache 58, an application specific signal processor (ASSP) 60, a ring bus 62, a SIO-2 codec 64, a SIO-1 codec 66, and an I$^2$S serial interface 68. A high-performance game port (HPGP) 70 provides an interface for a joystick, and a general purpose input-output port (GPI/0) 72 provides connections to multiplexed buses. A PCI-PCI bridge 74 serves to expand the number of PCI-bus peripheral cards that the PCI-CPU 12 can address.

The wave processor 56 is a dual-engine, sixty-four-channel, pipelined wave processor. The ASSP 60 is a programmable audio signal processor. Together these provide simultaneous support for multiple audio streams of different types. Such architecture enables complex, three-dimension positional gaming sound effects to be implemented while also supporting voice communications over the Internet from multiple sources. Embodiments of the present invention preferably support sixty-four independently programmable wave processor channels and provide for DIRECTSOUND® hardware acceleration with digital mixing of up to thirty-two wave streams. Audio streams of any frequency are converted to forty-eight kHz. Each of the sixty-four channels can be assigned its own parameters to control panning, tremolo, vibrato, and tone-filtering. The channels also support independently programmable special effects, e.g., reverb, chorus, flange, echo, and three-dimension spatial enhancements to create positional special effects. The high bandwidth PCI-bus is used to store MIDI-samples in main memory. Downloadable sound samples relieve needing ROM-type memory to store sound fonts, a allow software developers to control the sound PCI-bus audio accelerators.

A more obvious advantage that the PCI bus brings to audio applications is sheer bandwidth. At 133 MB/second, the PCI bus represents a much larger "pipe" than the 7 MB/second ISA bus. In addition to being able to move large amounts of data quickly through the bus, PCI accelerators are able to transfer multiple data streams with different destinations during a single bus master cycle. Because PCI audio accelerators can support multiple data streams of different types, it can also reduce the latencies typically associated with Internet-based interactive audio, phone and conferencing applications.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An audio accelerator peripheral (50), comprising:

a single integrated circuit (IC) having a PCI-interface (52) for providing a limited PCI-bus loading to a primary PCI-bus (16);

a PCI-bus resident audio accelerator core (24) disposed in the IC that includes a SOUNDBLASTER-type datapath (54) connected between said PCI-interface (52) and a wave processor (56) for creating a virtual ISA bus interfaced with said primary PCI-bus (16); and a PCI-PCI bridge core (26, 74) disposed in the IC and providing an interface between said PCI-interface (52) and a secondary PCI-bus (28) for a plurality of expansion input-output (I/O) controllers (30);

wherein the PCI-bus resident audio accelerator core (24) includes a dual audio-engine architecture with a 64-voice, pipelined, wavetable synthesizer, and a programmable audio signal processor that can simultaneously handle multiple audio streams of different data types, high-quality music synthesis, and voice compression and decompression, wherein said wavetable includes algorithms for frequency shifting stored digitized sound samples of an instrument playing to create a variety of notes, tones and octaves of a performance;

wherein the PCI-bus resident audio accelerator core (24) further comprises:

an application specific signal processor (ASSP) (60) implemented as a programmable audio-signal processor that combines with said wave processor (56) for providing simultaneous support for multiple audio streams of different types; and a wave cache (58) connected to both said ASSP (60) and said wave processor (56), and for providing temporary storage of memory data downloaded from said primary PCI-bus (16) that is later provided on-demand to said wave processor (56); and wherein said wave processor (56) and ASSP (60) combine to enable complex, three-dimension positional gaming sound-effects, and support sixty-four independently programmable wave processor channels for DIRECTSOUND-type hardware acceleration with digital mixing of up to thirty-two wave streams, and wherein audio streams of any frequency are converted to forty-eight kHz, and each of sixty-four channels can be assigned their own parameters to control panning, tremolo, vibrato, and tone-filtering.

* * * * *